UNITED STATES PATENT OFFICE 2,683,075

DIGESTION OF PHOSPHATE ROCK

Paul Caldwell, Evergreen Park, Ill., assignor, by mesne assignments, to Cannac Research and Development Company, Thornwood, N. Y., a joint venture No Drawing. Application June 5, 1951,
Serial No. 230,077

7 Claims. (Cl. 23—109)

This invention relates to the digestion of phosphate rock and, more particularly, to the recovery of the phosphatic value of such rock. The invention includes a method of recovering tricalcium phosphate from phospate rock in a form which is useful both as a fertilizer and as livestock feed as well as a method of producing such tricalcium phosphate in admixture with other compounds of known fertilizer value, and further includes the novel products obtained thereby.

It is conventional practice to recover the phosphatic value of phosphate rock by digestion of the rock with sulfuric acid. Regardless of whether this digestion is carried out with sufficient acid to form a product consisting predominantly of monocalcium acid phosphate or with a lesser amount of acid to form a superphosphate, the digestion requires the use of large quantities of the sulfuric acid. This fact has prompted numerous prior investigations to find an alternative reagent or procedure for recovering the phosphatic value of phosphate rock. The recent critical shortage of sulfuric acid has placed a further premium on the development of a phosphate rock digestion operation which does not depend upon the use of this acid.

All previous studies of this problem have led to the conclusion that such alternative phosphate rock digestion reagents produce less satisfactory end products than the product obtained by sulfuric acid digestion. For example, attempts to produce a suitable phosphatic material by digestion of phosphate rock with nitric acid have been thwarted by the substantial amount of calcium nitrate formed along the resulting acid phosphate or superphosphate. The hygroscopic nature of calcium nitrate is largely responsible for the wet and gummy consistency of the phosphate product and has defeated prior attempts to produce a phosphatic material from phosphate rock by digestion with nitric acid.

I have now devised a method of recovering the phosphatic value of phosphate rock by a procedure involving digestion of the rock with an inorganic nitrogenous acid, such as nitric acid, which is nevertheless characterized by the elimination from the phosphatic end product of any hygroscopic salts which might interfere with the stability and free flowing characteristics of this product. The method of my invention effects sequestering of the calcium component of the phosphate rock substantially only in the form of the ultimate phosphatic compound which, as explained further herein, comprises essentially tricalcium phosphate. The novel method of my invention is further characterized by the elimination of a substantial portion of any fluorine component of the phosphate rock so treated with the result that the end product is particularly suitable for use as livestock feed without requiring pyrolytic treatment of the rock or of the final product for the elimination of fluorine pursuant to conventional practice.

The method of recovering a non-hygroscopic tricalcium phosphate product from phosphate rock in accordance with my invention comprises dissolving the tricalcium phosphate component of the rock in an inorganic nitrogenous acid, separating the resulting phosphorus- and calcium-containing solution from the acid-insoluble material, adding to said solution potassium chloride, sodium chloride or sodium sulfate, neutralizing the resulting phosphorus-, calcium- and potassium- or sodium-containing solution with ammonia, and recovering the resulting precipitated tricalcium phosphate product. The added alkali metal salt effects precipitation of a large portion of any fluorine component of the rock in the form of potassium fluosilicate, the latter being advantageously separated from the aqueous phase prior to the ammonia-neutralizing step. The precipitated tricalcium phosphate product may be recovered in a form largely free of other compounds, or the ammonium and potassium or sodium salts present in the solution from which the tricalcium phosphate is precipitated may be crystallized therefrom so as to form an addition to the precipitated tricalcium phosphate.

The novel phosphatic product of my invention comprises a non-hygroscopic and substantially fluorine-free tricalcium phosphate obtained by dissolving the tricalcium phosphate component of phosphate rock in an inorganic nitrogenous acid, adding potassium chloride, sodium chloride or sodium sulfate to the resulting acid solution to remove fluorine therefrom in the form of precipitated potassium or sodium fluosilicate, and neutralizing the resulting solution with ammonia to precipitate the tricalcium phosphate product. This product may further contain, in accordance with the invention, an ammonium salt and potassium or sodium nitrate obtained by crystallization from the ammonia-neutralized solution from which the tricalcium phosphate is precipitated. The resulting product containing these compounds comprises a highly effective, stable and non-hygroscopic fertilizer composition.

The product obtained by the method of my invention is substantially non-hygroscopic in the accepted sense that it does not absorb a significant amount of moisture from the atmosphere. The product does adsorb atmospheric moisture to some extent but this adsorbed moisture does not impart to the product any significant tendency to become wet, cake-like or gummy. Although the product obtained with the use of the potassium salt pursuant to the invention is less hygroscopic than that obtained with the use of the sodium salt, both products can be accurately characterized as substantially non-hygroscopic under average United States weather conditions.

The product of my invention is characterized by this non-hygroscopicity in the unwashed but dry state. If the precipitated product were washed, it would be expected that it would be non-hygroscopic, but drying of the washed precipitate causes a substantial reversion of the phosphatic precipitate to an insoluble form whence it is not readily available for fertilizer value. However, when the precipitate is dried without washing, there is no significant reversion of its phosphatic content to an insoluble form and the resulting dried product is nevertheless substantially non-hygroscopic.

Digestion of the phosphate rock with the inorganic nitrogenous acid effects dissolution of the tricalcium phosphate component of the rock with the resulting production of a solution comprising phosphoric acid and calcium nitrate. The acid-insoluble components of the rock settle out of this solution and are preferably removed before further treatment of the phosphoric acid-calcium nitrate solution. The separated solution will further contain most if not all of any fluorine component of the rock in the form of fluosilicic acid. When the potassium chloride or sodium chloride or sulfate is added to this solution in accordance with the invention, a large portion of this fluorine component of the solution is removed in the form of a precipitate of the corresponding alkali metal fluosilicate. The alkali metal salt (an expression which will be used hereinafter to refer generically to the potassium chloride, sodium chloride or sodium sulfate) is added in amount not only substantially equivalent stoichiometrically to the fluorine component of the phosphoric acid solution but also in amount substantially equivalent stoichiometrically to the calcium nitrate content of the acid solution. Upon separation of the precipitated alkali metal fluosilicate, the resulting solution will contain phosphoric acid, calcium nitrate and the added alkali metal chloride or sulfate. Neutralization of this solution with ammonia will then precipitate the calcium and phosphorus components of the solution. The solution from which these components have been precipitated is therefore substantially free of calcium ions and contains ammonium ions, alkali metal ions, chloride ions and nitrate ions. Under the neutral or slightly alkaline conditions prevailing in the solution, the equilibrium between these ions is such that if the solution is concentrated to crystallize dissolved salts therefrom, the crystallized salts will comprise essentially ammonium chloride and the alkali metal nitrate.

It will be seen from the foregoing description of the chemical aspects of my novel method that the tricalcium phosphate component of the phosphate rock is ultimately obtained in the form of tricalcium phosphate uncontaminated by any hygroscopic calcium salts. Inasmuch as the fluorine component of the rock is largely in the form of a calcium salt, and inasmuch as the rock generally contains other calcium salts such as the carbonate, the solution which is neutralized with ammonia will contain an excess of calcium over and above that which will combine with the phosphorus to precipitate tricalcium phosphate. Accordingly, the precipitated product will contain other non-hygroscopic calcium compounds such as calcium hydrate or possibly tetracalcium phosphate, or both. If, as described more fully hereinafter, the solution from which the tricalcium phosphate product is precipitated is further suitably concentrated, an ammonium salt and alkali metal nitrate are obtained either for separate use or for addition to the precipitated tricalcium phosphate product in the preparation of a complete fertilizer material. In the latter event, the ammonium salt and the nitrate both provide available nitrogen for the fertilizer, and where potassium chloride is used as the added alkali metal salt the resulting potassium nitrate forms a particularly suitable source of potash.

The method of my invention is applicable to the treatment of any phosphate rock. Preparation of the rock for digestion with nitric acid is substantially the same as that which prevails in the conventional digestion of such rock with sulfuric acid. Thus, satisfactory results can be obtained with rock ground to such a degree of fineness that 80–90% will pass through a 60 mesh screen (Tyler standard), although the rock may be more finely ground so that up to about 95% will pass through a 100 mesh screen. As in the case of other methods of digesting phosphate rock, the degree of subdivision of the rock is of importance only in so far as it affects the rate of its reaction with the digesting agent. Where the speed of reaction can be sacrificed somewhat for ease in separating the acid-insoluble portion of the rock, a coarser starting material such as 20 mesh rock can be used.

The digesting agent used in the practice of the invention comprises such inorganic nitrogenous acids as nitric acid or the acid or acid mixtures obtained by the passage of gaseous nitrogen oxides through an aqueous medium. Thus, the nitrogenous acid may comprise nitric acid from a commercial source or it may comprise nitrogenous acids produced at the site of the digestion operation by the passage of gaseous nitrogen oxides through water or other aqueous liquor. Alternatively, the nitrogenous digestion agent may be produced in situ by passing gaseous nitrogen oxides through an aqueous suspension or slurry of the phosphate rock, the aqueous medium being either water, nitric acid of any concentration ranging from dilute to concentrated form, or either of these augmented by recycled liquor from the ammonia-neutralizing step.

The concentration of the nitrogenous digestion agent, which solely for convenience and not by way of limitation will be referred to hereinafter as "nitric acid," may range from dilute to concentrated form while nevertheless producing effective results. Dilute solutions of the nitric acid require more prolonged digestion periods than the concentrated acid, whereas the highly concentrated acid requires more care than the dilute acid in controlling the elevation of the temperature of the reaction mass which, if uncontrolled, promotes excessive volatilization of the acid. Thus, dilute nitric acid may be used with particular effectiveness in digesting very finely ground phosphate rock and relatively concentrated acid may be used satisfactorily in digesting more coarsely ground rock.

The amount of nitric acid required in the digestion stage will depend essentially upon economic considerations. Inasmuch as the nitric acid is more expensive than the phosphate rock, it is generally preferred to use such relative amounts of the rock and acid as will effect substantially complete utilization of the acid, but a balance should obviously be achieved between the degree of utilization of the acid and the degree of recovery of the phosphatic component of the rock. Where such a balance, decided upon economic grounds, results in incomplete dissolution of the available phosphatic component of the rock, the rock residue from the acid treatment may be added to a fresh charge of rock for further recovery of its phosphatic value.

The temperature maintained during the digestion operation is not critical although more elevated temperatures are conducive to more rapid digestion. The action of the nitric acid on the phosphate rock, being exothermic, tends to promote the development of an elevated temperature throughout the reaction mass so that it is generally unnecessary to apply extraneous heat to the digestion operation. The only precaution which need be observed with respect to the temperature of the digestion operation is that the rate of reaction should be controlled, either by the rate of addition of the reagents or by their concentration, or by both, so as to avoid the development of temperatures which cause excessive volatilization and loss of the acid from the reaction mass. The development of zones of local overheating is substantially eliminated by mechanical agitation of the digestion mass, this agitation preferably continuing throughout the entire reaction period.

During the course of the digestion operation, the tricalcium phosphate component of the phosphate rock is decomposed to form phosphoric acid and calcium nitrate both of which go into solution in the aqueous medium. The reaction mass resembles a thin slurry or suspension and does not set up as does the reaction mass resulting from sulfuric acid digestion of phosphate rock. Thus, sand and numerous other extraneous components of the phosphate rock which are not soluble in the nitric acid remain in suspension while the digestion mass is being agitated and settle readily when the reaction mass is allowed to become quiescent. The aqueous phase containing the phosphoric acid and calcium nitrate may then be largely separated from the insoluble material by decantation followed, if desired, by filtration to remove that portion of the aqueous phase entrained in the sludge-like residue.

The solution thus separated from the acid-insoluble residue contains not only phosphoric acid and calcium nitrate but further contains the acid-soluble fluorine component of the phosphate rock in the form of fluosilicic acid. The fluosilicic acid is effectively removed from the solution by the addition thereto of the alkali metal salt. Although this result is readily achieved at substantially ambient temperature when the alkali metal salt is added in the form of a solution thereof, the solution may with advantage be heated in order to facilitate dissolution of the alkali metal salt when the latter is added in solid form. At such temperatures, and with the aid of vigorous mechanical agitation, a major portion of the fluosilicic acid present in the solution will be precipitated so that it can be removed.

The alkali metal salt added to the phosphoric acid-calcium nitrate solution as described may be either potassium chloride, sodium chloride or sodium sulfate. Of these compounds, sodium chloride is the most abundant and least expensive and is preferred where economical considerations predominate. However, where it is desired to obtain an ultimate tricalcium phosphate product enhanced in fertilizer value by virtue of the presence of an additional potash content, and where as mentioned previously the most non-hygroscopic product is desired, I have found it particularly advantageous to use potassium chloride in this stage of the method. The aforementioned alkali metal salts are preferred in practicing the invention for the reason that they have generally satisfactory solubility characteristics and do not cause precipitation of the calcium component of the phosphoric acid-calcium nitrate solution. Thus, calcium chloride will not be precipitated if an alkali metal chloride is used, and calcium sulfate will not be precipitated rapidly by the addition of sodium sulfate for the reason, at least in part, that calcium sulfate is soluble in acidic solutions and in solutions containing ammonium salts, both of these conditions prevailing at one stage or another in the practice of the method of my invention. On the other hand, the addition of potassium sulfate causes the immediate precipitation of calcium sulfate and thus precludes the possibility of substantially ammoniating the digestion liquor while its calcium component is still in solution. Accordingly, solely for convenience and without any intention of limiting the invention thereto, the practice of the invention will be described hereinafter with specific reference to the use of potassium chloride.

The amount of potassium chloride which is added to the phosphoric acid-calcium nitrate solution should be not only sufficient to precipitate a major portion of the fluorine content of the solution in the form of potassium fluosilicate but should be substantially equivalent stoichiometrically to the calcium nitrate content of the solution. The presence of such a stoichiometric amount of potassium chloride in the solution insures the subsequent removal from the solution of substantially all of the calcium component thereof in the form of tricalcium phosphate or other non-hygroscopic calcium compound when the solution is subsequently neutralized with ammonia and the resulting precipitated product is separated and recovered.

Following completion of the dissolution of the potassium chloride in the phosphoric acid-calcium nitrate solution with the resulting precipitation of potassium fluosilicate, advantageously accelerated by the aforementioned agitation, the potassium fluosilicate precipitate is separated from the resulting aqueous phase by decantation, filtering, or the like. The resulting solution is then delivered to a suitable vessel wherein it is neutralized with ammonia.

Neutralization of the substantially fluorine-free phosphoric acid-calcium nitrate-potassium chloride solution may be effected with either anhydrous or aqueous ammonia, although anhydrous ammonia is preferred inasmuch as it is more consistent with the maintenance of high salt concentrations as described hereinafter. The amount of ammonia added in this stage should be sufficient to completely neutralize the solution and preferably should be sufficient to provide a slightly alkaline pH. As this neutralization is completed, accompanied by appropriate agitation of the solution, the phosphatic component of the solution is precipitated predominantly in the form of tricalcium phosphate and substantially all of the calcium component is precipitated either combined with the phosphorus or in the form of calcium hydrate. The resulting aqueous phase is substantially free of dissolved calcium compounds such as calcium nitrate so that the tricalcium phosphate separated from the solution is substantially free of any entrained calcium salt which would tend to impart hygroscopic properties thereto.

It will be seen, accordingly, that the precipitated tricalcium phosphate product, separated from the aforementioned solution and appropriately dried, is not only substantially non-hygroscopic but is also substantially free from fluorine. Thus, the product so obtained is particularly suitable for use as an adjunct to livestock feed without requiring any pyrolytic treatment, as is usually the case with phosphatic feeds obtained from phosphate rock, for the elimination of fluorine to a tolerable minimum value. The tricalcium phosphate product obtained as described hereinbefore is also particularly suitable for use as a fertilizer. But when the product is to be used solely as a fertilizer it will be clearly apparent that there is no need to remove, during its production, the various insoluble residues and any alkali fluosilicate which is formed. Accordingly, the tricalcium phosphate product obtained in this manner will contain the aforesaid insolubles as diluents, but the limited amount of these diluents does not adversely affect the value of the product as a fertilizer material. Although tricalcium phosphate is not as readily soluble as the acid phosphate and superphosphates, it is well established that my product is sufficiently soluble under conditions of use to meet all the requirements of an ideal fertilizer.

The solution from which the tricalcium phosphate product has been separated will contain substantial concentrations of potassium, ammonium, nitrate and chloride ions. The equilibrium constants of this solution, in its neutral or slightly alkaline state, are such that when the solution is evaporated to increase the concentration of these ions there will be obtained crystals of ammonium chloride and potassium nitrate. It will be apparent, accordingly, that the solution may be concentrated by evaporation in such manner as to obtain both salts in admixture with one another or in such manner as to effect separate recovery of the two salts. The ammonium and potassium salts so obtained may be used for any purpose, although I have found it advantageous to admix them with the tricalcium phosphate product so as to form a more complete fertilizer material.

Concentration of the solution from which the precipitated tricalcium phosphate is separated may also be effected by recycling the solution to earlier steps in the process. For example, the ammonium chloride-potassium nitrate solution may be returned to the digestion operation as a source of at least a portion of the aqueous medium in which the rock is digested. However, if the introduction of such a solution into the digestion operation is incompatible with a desired relatively high concentration of acid, the solution may be returned to any step immediately following the digestion operation itself. Thus, the ammonium chloride-potassium nitrate solution can be admixed with the reaction mass obtained as a result of the digestion, or the solution may be introduced into the separated phosphoric acid-calcium nitrate solution either before or after the addition of potassium chloride thereto. On the other hand, the ammonium chloride-containing solution should not be recycled to any stage of the operation prior to precipitation of the fluosilicate where this precipitation is effected by a sodium salt inasmuch as sodium fluosilicate is unduly soluble in ammonium salt-containing solutions. In practicing any of these alternative recycling operations, the ammonium salt-containing solution may be recycled either in the form in which it is separated from the precipitated tricalcium phosphate or the solution may be concentrated by evaporation prior to being so recycled. However, where the ammonia neutralized solution containing precipitated tricalcium phosphate is subjected to evaporative concentration to effect crystallization of ammonium chloride and potassium nitrate along with the precipitation of the tricalcium phosphate, the liquor from which the solids are separated will generally be sufficiently concentrated to be in suitable condition for recycling directly to any earlier stage of the process.

The building up of the concentration of ammonium chloride and potassium nitrate in the solution from which the tricalcium phosphate is precipitated is not adversely affected by the recycling of the ammonium chloride-potassium nitrate solution to the acidic liquors prevailing in earlier stages of the process. Ammonia is the only component of the recycled salts which is volatilized to any significant extent in these acidic liquors, and this component is readily and adequately replaced in the final stage of the operation wherein ammonia is introduced to effect precipitation of the tricalcium phosphate.

The following specific example is merely illustrative of the practice of the method of my invention and must not be considered as any limitation thereof. In a stainless steel vessel, 155 parts by weight of a 35% solution of nitric acid were added to 100 parts by weight of 77% B. P. L. rock ground to about 80% minus 100 mesh. The vessel was of such size that it was less than half filled by the acid-phosphate rock mixture. The temperature of the mixture rose to about 40° C. as the reaction proceeded and agitation of the mixture was continued until the evolution of gas ceased, thus indicating that the acid was substantially completely consumed. The remaining insoluble material was removed by filtering and was introduced along with another batch of phosphate rock in a subsequent extraction operation. To the filtrate, comprising the solubilized phosphate component of the rock, there were added 66 parts by weight of a potassium chloride in the form of a saturated solution at about 100° C. The mixture was agitated to facilitate reaction and the resulting precipitate of potassium fluosilicate was removed by filtering. The filtrate, comprising the solubilized phosphatic component of the rock now largely freed of fluorine, was then neutralized with anhydrous ammonia until a pH of 7 was attained. The resulting precipitate of the tricalcium phosphate product was then removed by filtering and the unwashed filter cake was dried in an oven at a temperature of about 100° C. until firm and dry in appearance. The dried product comprised about 175 parts by weight of a non-hygroscopic tricalcium phosphate product containing by analysis 20% total P₂O₅, 19.5% available P₂O₅, 5% N, 8% K₂O and about 20% water. When the moisture content of the product was further reduced by drying at a higher temperature, the phosphorus, nitrogen and potash contents of the product were correspondingly increased in percentage of the total weight of the product. The filtrate from which the tricalcium phosphate product had been operated was concentrated by evaporation, whereupon a portion of the potassium nitrate and ammonium chloride components of the liquor were separated by crystallization and were combined with the previously separated tricalcium phosphate product in producing the complete fertilizer material. The mother liquor from which the potassium nitrate and ammonium chloride had been separated contained excess potassium chloride. By returning this liquor to the next batch operation in the form of the aqueous medium by which potassium chloride was added to the acid-solubilized phosphate solution, the extraneous potassium chloride which had to be added to this mother liquor was reduced to 60 parts by weight in lieu of the 66 parts used in the initial batch.

It will be seen, accordingly, that the method of the present invention makes possible the recovery of the tricalcium phosphate component of phosphate rock in a substantially non-hygroscopic form either containing substantially all of the original fluorine component of the rock or substantially free of fluorine. The method of the invention is also amenable to such building up of the concentration of nitrogenous and potassium salts as to facilitate precipitation of these salts in addition to the ultimate precipitation of the tricalcium phosphate with the resulting production of a complete and high potency fertilizer material analyzing, for example, about 5% available nitrogen, 18–20% available phosphorus expressed as P₂O₅, and about 8% potash expressed as K₂O. It should be noted that this mixture of nitrogenous and potassium salts with the tricalcium phosphate product, like the tricalcium phosphate product itself, is not only non-hygroscopic, non-caking and substantially free-flowing, but is stable under storage conditions. In this respect, the complete fertilizer material of my invention offers a further advantage over other fertilizer materials in which the phosphatic material is present in an acidic form, the acidic nature of the phosphatic material in such previously available products tending to cause volatilization of the acid components of the nitrogenous salts such as ammonium nitrate and alkali metal nitrate admixed therewith and further tending to cause rotting of fibrous containers such as bags in which it is marketed. Thus, the precipitated and dried product, advantageously broken up after drying, can be marketed directly without any curing operation or the like with the assurance that it will remain stable and in free-flowing condition up through the time of its use.

I claim:

1. The method of recovering a substantially non-hygroscopic calcium phosphate product from phosphate rock containing calcium phosphate which comprises dissolving the phosphorus component of the rock in an inorganic nitrogenous acid with the resulting formation of an acidic aqueous phase containing substantially all of the acid-solubilized calcium and phosphorus components of the rock in the form of calcium nitrate and phosphoric acid; adding to said calcium- and phosphorus-containing aqueous phase an alkali metal salt of the group consisting of potassium chloride, sodium chloride and sodium sulfate in an amount such that, in addition to the amount thereof consumed by the resulting precipitation of a substantial portion of any acid-soluble fluorine component of the rock in the form of an insoluble alkali metal fluosilicate, there will be further incorporated in said aqueous phase an amount of the alkali metal salt at least substantially equivalent stoichiometrically to the calcium nitrate content of said aqueous phase; and after addition of said amount of the alkali metal salt adding ammonia to the alkali metal salt-containing aqueous phase, thus precipitating therefrom the aforesaid dissolved calcium and phosphorus components of the rock in the form of a substantially non-hygroscopic calcium phosphate product.

2. The method according to claim 1 wherein the alkali metal salt is potassium chloride.

3. The method according to claim 1 wherein the nitrogenous acid is nitric acid.

4. The method according to claim 1 wherein the phosphatic product precipitated by the ammoniation is separated from the accompanying aqueous phase, and the separated product is dried without washing.

5. The method according to claim 1 wherein the ammoniated aqueous phase is concentrated to promote precipitation of ammonium and alkali metal salts therein, and all precipitated salts are recovered together.

6. The method according to claim 1 wherein the ammoniated aqueous phase is separated from the precipitated phosphatic product and is returned to an earlier step in the method in order to effect concentration of the salts contained in said ammoniated aqueous phase and thereby promote their precipitation along with the precipitated phosphatic product.

7. The method according to claim 1 wherein the alkali metal fluosilicate precipitated by the incorporation of the alkali metal salt in the aqueous phase resulting from the treatment of the phosphate rock with the nitrogenous acid is separated from the aqueous phase prior to the treatment of said aqueous phase with ammonia.

References Cited in the file of this patent

UNITED STATES PATENTS

| Number | Name | Date |
| --- | --- | --- |
| 1,487,205 | Carothers | Mar. 18, 1924 |
| 1,788,828 | Goldberg | Jan. 13, 1931 |
| 1,806,029 | Thorssell | May 19, 1931 |
| 1,849,703 | Boller | Mar. 15, 1932 |
| 1,849,989 | Moore | Mar. 15, 1932 |
| 1,856,187 | Johnson | May 3, 1932 |
| 1,859,738 | Johnson | May 24, 1932 |
| 1,869,688 | Heimann | Aug. 2, 1932 |
| 1,948,520 | Harvey | Feb. 27, 1934 |
| 1,983,024 | Foss | Dec. 4, 1934 |
| 2,057,025 | Hogens et al. | Oct. 13, 1936 |
| 2,102,831 | Brill et al. | Dec. 21, 1937 |
| 2,114,600 | Larsson | Apr. 19, 1938 |
| 2,164,627 | Seyfried | July 4, 1939 |
| 2,176,464 | Merchant | Oct. 17, 1939 |
| 2,384,814 | Coleman | Sept. 18, 1945 |
| 2,614,040 | Kaikinger | Oct. 14, 1952 |

FOREIGN PATENTS

| Number | Country | Date |
| --- | --- | --- |
| 299,796 | Great Britain | Oct. 29, 1928 |

(Other references on following page)

FOREIGN PATENTS

| Number | Country | Date |
|---|---|---|
| 376,934 | Great Britain | June 25, 1931 |
| 357,473 | Great Britain | Sept. 24, 1931 |
| 467,843 | Great Britain | Jan. 6, 1936 |
| 615,476 | Great Britain | Jan. 6, 1949 |

OTHER REFERENCES

Frear et al., "Calcium metaphosphate: effect of impurities on fusibility, citrate solubility, and hygroscopicity" Industrial and Engineering Chemistry, vol. 36, No. 9, Sept. 1944, pages 835–840.

Hill, "Phosphate Fertilizers," Agricultural Chemicals, vol. V, No. 12, pages 55 and 86.

Sauchelli, "Manual on Fertilizer Manufacture," Davidson Chemical Corporation, Baltimore, Md., page 94.